Jan. 26, 1954

J. G. WEHRWEIN 2,667,039

WATER COOLER THERMOSTATIC CONTROL

Filed Aug. 22, 1950

INVENTOR
John G. Wehrwein.
BY
ATTORNEYS.

Jan. 26, 1954　　　　J. G. WEHRWEIN　　　　2,667,039
WATER COOLER THERMOSTATIC CONTROL
Filed Aug. 22, 1950　　　　　　　　　　3 Sheets-Sheet 2

INVENTOR
John G. Wehrwein.
BY
ATTORNEYS.

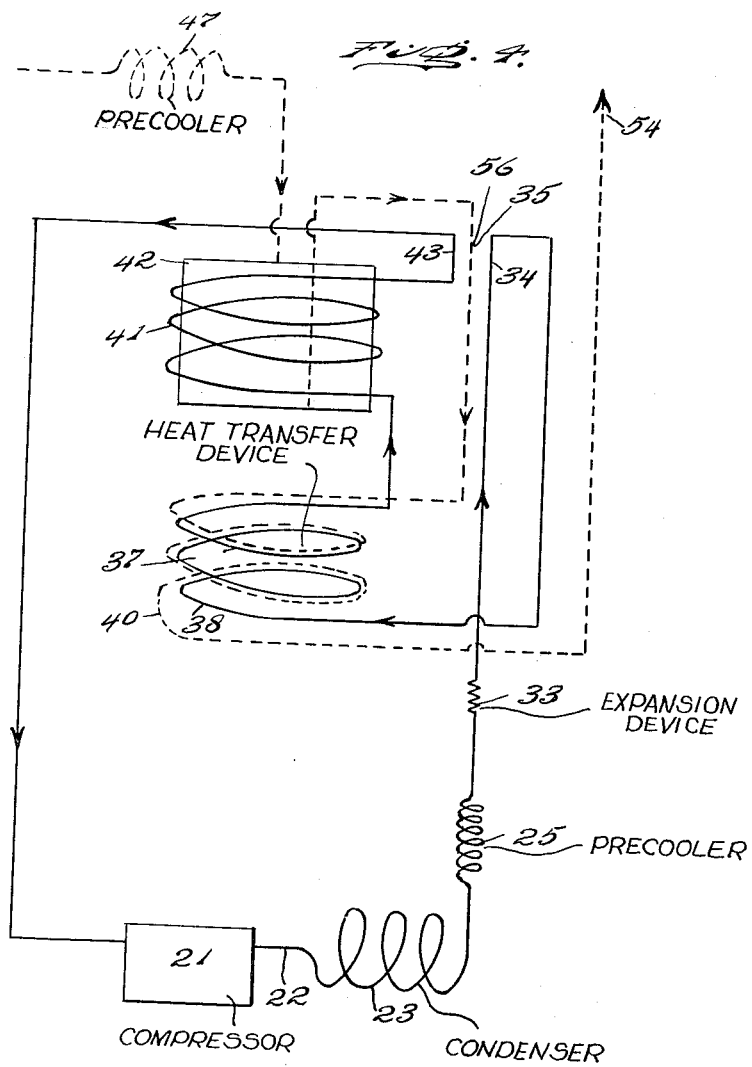

Patented Jan. 26, 1954

2,667,039

UNITED STATES PATENT OFFICE 2,667,039

WATER COOLER THERMOSTATIC CONTROL

John G. Wehrwein, Glen Riddle, Pa., assignor to Sunroc Refrigeration Company, a corporation Application August 22, 1950, Serial No. 180,852

2 Claims. (Cl. 62—4)

The present invention relates to refrigerator control and particularly to control of mechanically refrigerated water coolers.

A purpose of the invention is to accomplish control by bringing the refrigerant inlet and outlet connections and the water inlet connection of a heat transfer unit together at a point in heat transfer relation with the thermostat, preferably in a thermostat well.

A further purpose is to subject the thermostat at the same point to the influence of the inlet and outlet refrigerant temperature and the inlet water temperature to a heat transfer unit.

Further purposes appear in the specification and in the claims.

In the drawings I have chosen to illustrate one only of the numerous embodiments in which my invention may appear, selecting the forms shown from the standpoints of satisfactory operation, clear illustration and convenient representation of the principles involved.

Figure 4 is a diagram of the main refrigerant and water circuits.

Figure 1:
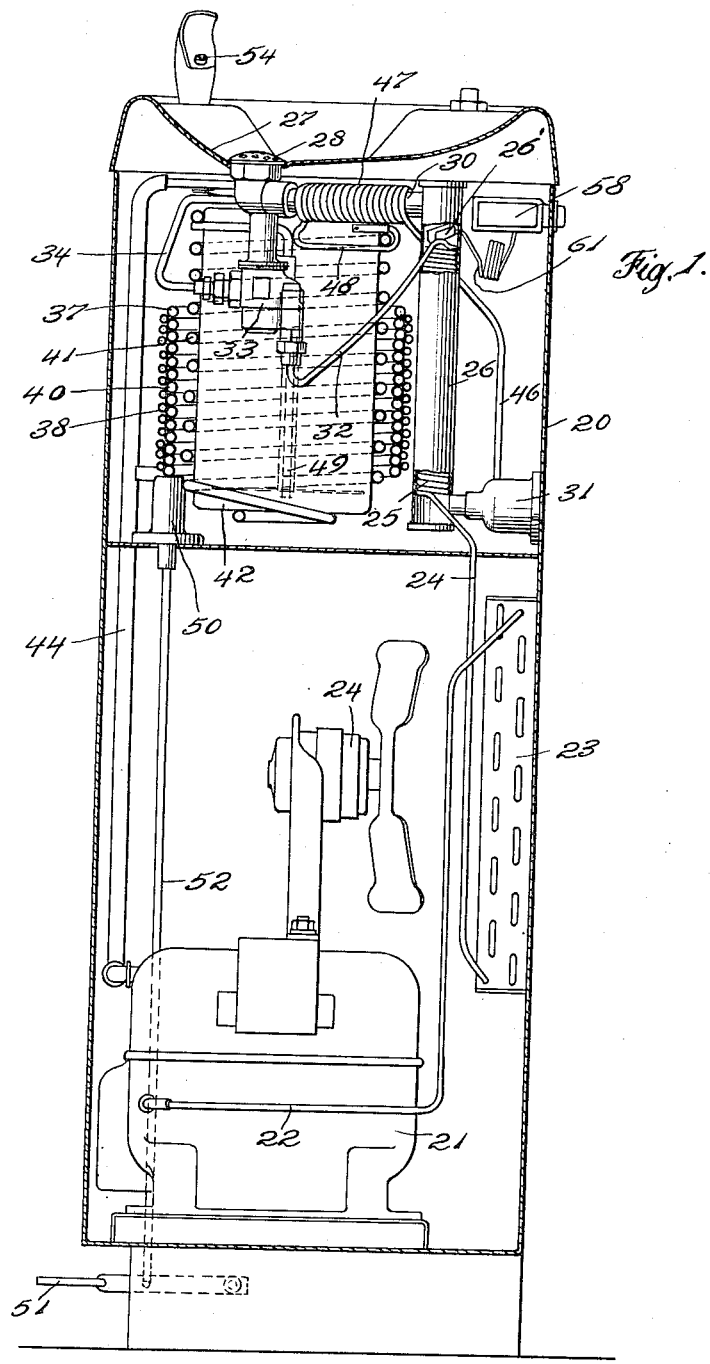
Figure 1 is a central vertical section illustrating diagrammatically the water cooler of the invention.
Figure 2:
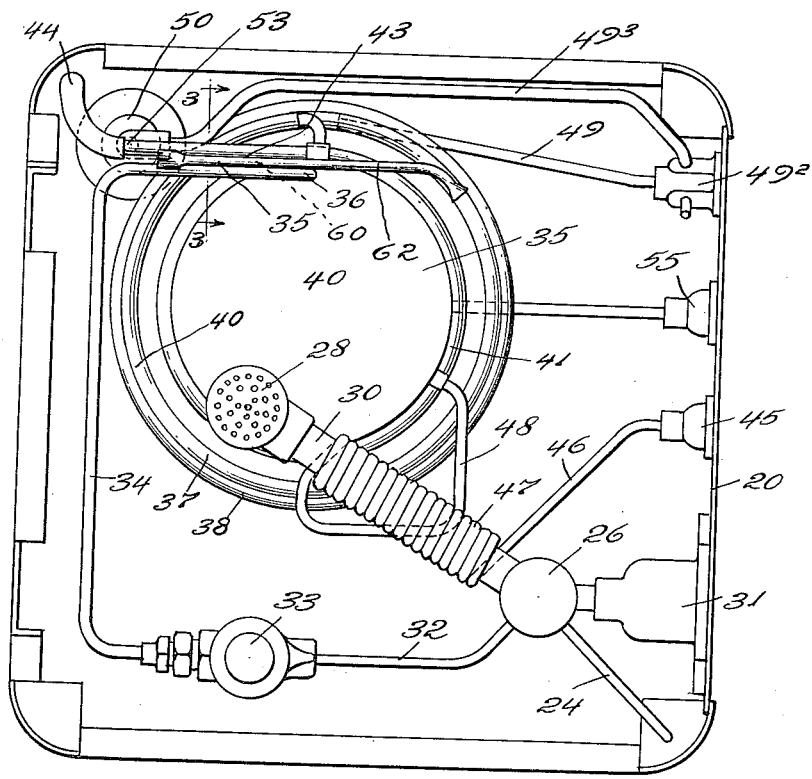
Figure 2 is a top plan view of the water cooler of Figure 1 with the cover removed and to enlarged scale.

Describing in illustration but not in limitation and referring to the drawings:

In the prior art, in thermostatic control of the starting and stopping of a refrigerant compressor of a water cooler, the best practice as shown in Morrison et al. U. S. Patent 2,492,054, granted December 20, 1949, for a Refrigeration Thermostatic Control, has been to extend the thermostatic well diagonally across the full height of the heat transfer unit of the water cooler, bringing it in heat transfer contact with the inlet and outlet water temperatures and the inlet and outlet refrigeration temperatures. This has required the use of a long bulb in the well, some part of the bulb being in heat transfer relation with the conditions at the inlet of the water and the outlet of the refrigeration and some other part being in heat transfer contact with the conditions at the outlet of the water and the inlet of the refrigerant.

This leads to inaccuracy since the percentage expansion of the fluid in the thermostat is decreased due to the presence of inactive or contrary acting fluid at the opposite end of the bulb.

I find that it is entirely unnecessary and may be confusing to have the heat transfer relationship with the outlet water, as long as the thermostat is controlled by the inlet and outlet refrigerant and the inlet water.

In the drawing I illustrate a water cooler cabinet 20 mounting a combined motor and compressor unit 21, suitably a hermetic unit. Compressed refrigerant from the compressor leaves by a fluid connection 22 to an air cooled condenser 23, which is subjected to a blast of air, when the water cooler is operating, from electric fan 24. Refrigerant leaves the air cooled condenser 23 by a fluid connection 24 which connects with the bottom of refrigerant pre-cooler coil 25 in precooler housing 26 suitably of vertical character. The precooler housing 26 receives drain water from sump 27 through sump drain connection 28 and cross flow pipe 30 to the top of the precooler housing 26. The water is thrown to the outside of housing 26 by trough 26'. Water from the bottom of the precooler housing passes to the sewer through drain connection 31.

Figure 3:
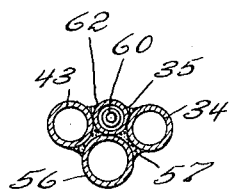
Figure 3 is a section of Figure 2 on the line 3—3 to enlarged scale.

Refrigerant from the top of precooler coil 25 is led through pipe 32 to constriction 33, in this case an expansion valve as well known. From the opposite side of the constriction 33 refrigerant passes through fluid connection 34 to control point 35, which is shown more in detail in Figure 3. The inlet refrigerant pipe 34 passes through control point 35 and then enters refrigerant inlet connection 36 leading to the bottom of tube-beside-tube heat transfer unit 37.

The refrigerant passes up through the tube-beside-tube refrigerant coil 38 in physical contact turn with turn with the water coil 40 and leaves by the top of the refrigerant coil and passes to the bottom of early cooling coil 41 secured to the outside wall of storage tank 42 in heat transfer relation therewith. From the top of early cooling coil 41 it passes by pipe 43 past control point 35 and then by suitably insulated pipe 44 back to the inlet side of the compressor.

The water enters by water inlet 45 from the domestic drinking water system and passes through pipe 46 and precooling coil 47 on the outside of precooling cross flow pipe 30 and in heat transfer relation with it. The water then passes by pipe 48 to the inlet of tank 42. The water from the outlet 49 near the bottom of tank 42 passes from the top downwardly through tube-on-tube water coil 40, then leaves by pipe 49' from the bottom to water coil drain fitting 49².

From the drain fitting a connection 49³ leads to bubbler valve 50 which is controlled by pivoted foot pedal 51 and pull rod 52. Pipe 53 leads to bubbler or other dispenser 54. Drain connection 55 drains the tank.

The water inlet connecting the storage tank discharge 49 and the tube-beside-tube flows through pipe 56 which passes by the control point 35 and is in good heat transfer relation for example due to soldering at 57 with the refrigerant inlet 34 and the refrigerant outlet 43. The main circuit for starting and stopping the compressor and fan is controlled by switch 58 (including a relay not shown) which is operated by a bellows (not shown) as well known under the action of a thermostatically expanding liquid from a bulb 60 carried by a tube 61 which passes through a thermostat well 62 in heat transfer relation with the other tube at the control point.

In operation, the refrigerant which is compressed passes from the compressor through the condenser, then through the precooler, and thence past the constricter, then past the control point in heat transfer relation with the thermostat, then in heat transfer relation with the heat transfer unit, then through the early cooling coil, then again past the control point in heat transfer relation with the thermostat and back to the inlet side of the compressor.

Water enters through the precooler and storage tank and then passes past the control point, then through the heat transfer unit and then to the dispenser.

The thermostat responds to three temperatures at the same point. One is the temperature of the refrigerant entering, the second is the temperature of the refrigerant leaving and the third is the temperature of the water entering the tube-beside-tube heat transfer unit. For best results the temperature of the water leaving is not brought in contact with the thermostat at the control point.

When the combined temperature of the refrigerant entering and the refrigerant leaving drops low enough, the thermostat causes the switch 58 to open and cut off the current to the compressor motor and fan motor. On the other hand, as soon as the bubbler is operated, the valve 50 opens and warm water entering comes into contact with the control point and warms up the thermostatic bulb, causing the thermostatic fluid to expand and close switch 58 starting the motor of the compressor and fan. I find that by this procedure very much more accurate and effective control can be obtained than that of the prior art.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a water cooler thermostatic control, a heat transfer unit having water passage provided with inlet and outlet connections to the heat transfer unit and having refrigerant passages provided with inlet and outlet connections to the heat transfer unit, a refrigeration system including a compressor and condenser connected to the refrigeration inlet and outlet connections and having a thermostat controlling the starting and stopping of the compressor, the refrigerant inlet, refrigerant outlet and water inlet to the heat transfer unit being brought together in heat transfer relation at one point, and a thermostatic well including the thermostat in heat transfer relation with the refrigerant inlet and outlet connections and the water inlet connection at the common point.

2. In a water cooler, a heat transfer unit having water and refrigerant inlet and outlet connections to the heat transfer unit, a refrigerant system including a compressor, a condenser and a constrictor connected to the heat transfer unit at the refrigerant inlet and outlet connections and including a thermostat and thermostatic switch controlling the turning on and off of the compressor, and a control at which the refrigerant inlet, refrigerant outlet and water inlet to the heat transfer unit are brought together at the same point in heat transfer relation with the thermostat.

JOHN G. WEHRWEIN.

References Cited in the file of this patent

UNITED STATES PATENTS

| Number | Name | Date |
| --- | --- | --- |
| 2,359,791 | Ralston | Oct. 10, 1944 |
| 2,500,684 | Johnson | Mar. 14, 1950 |